UNITED STATES PATENT OFFICE.

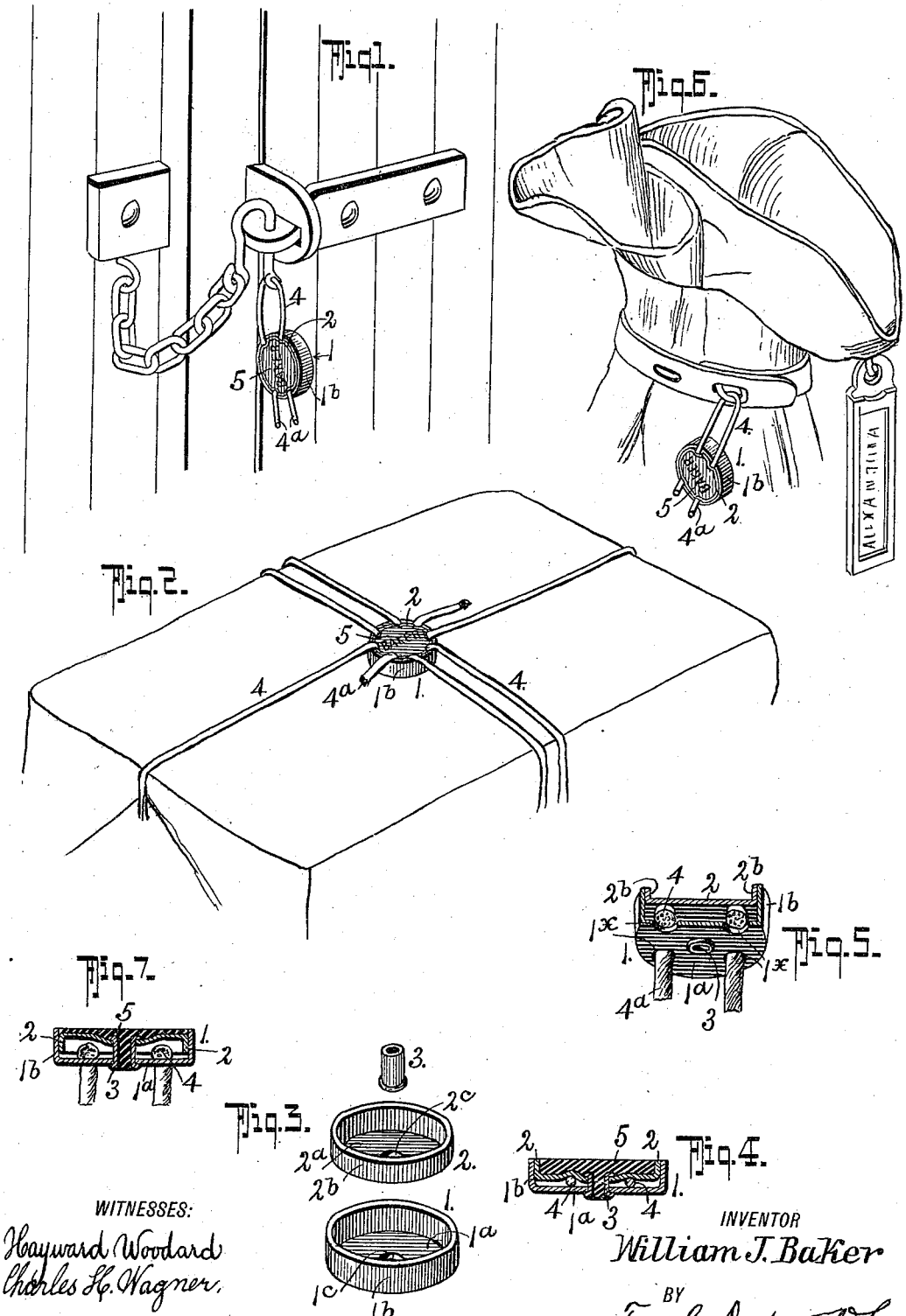

WILLIAM J. BAKER, OF NEWPORT, KENTUCKY.

SEAL.

984,736.  Specification of Letters Patent.  Patented Feb. 21, 1911.

Application filed May 27, 1910. Serial No. 563,756.

*To all whom it may concern:*

Be it known that I, WILLIAM J. BAKER, residing at Newport, in the county of Campbell and State of Kentucky, have invented certain new and useful Improvements in Seals, of which the following is a specification.

My invention is an improved seal for use in a variety of ways, for example, as a car door seal, or a package seal, etc.

I am aware that heretofore seals have been provided in which the ends of a cord, wire or other like article have been brought together and secured between two bodies in a manner that such bodies would have to be destroyed or mutilated in order to remove the secured article from the same, and I have in mind particularly those seals disclosed in the patents to G. A. Huising, #871,872, November 26, 1907; F. W. Brooks, #758,896, May 3, 1904; H. Thompson, #742,085, October 20, 1903; E. J. Brooks, #524,975, August 14, 1894 and J. Wappenstein, #87,017, February 16, 1869. In these patents is shown a seal composed generally of two bodies between which the ends of the cord or wire are held, one of the bodies having a shank that passes through the other body and may be upset to hold the bodies together. I therefore do not broadly claim such construction, but my invention resides in the provision of two cup-like bodies of thin metal, each being of similar shape, differing principally in size, fitting one within the other and centrally apertured to receive a rivet or eyelet which when upset serves to secure the two members together, one within the other, with the ends of the wire, cord, or other tie member held between the two cup members.

In the drawings: Figure 1, is a perspective view of my invention showing it applied as a car door seal. Fig. 2, shows the use of the invention for sealing the tie cord to a package. Fig. 3, is a perspective view of the sealing parts separated before assembling. Fig. 4, is a cross section of the seal when the ends of the tie wire or cord are secured thereby. Fig. 5, is a detail sectional perspective of a modified form in which one of the members has apertures $1^x$ for the tie members $4^a$. Fig. 6, is a perspective view illustrating the invention in use as a mail bag seal. Fig. 7, is a cross section of a slight modification.

Referring now to the accompanying drawings in which like letters and numerals of reference indicate like parts in all of the figures, it will be observed that my improved seal is composed of two cup-like members 1 and 2 respectively, which in practice, are preferably formed of the same shape differing only in size so that the member 2 will fit within the member 1, as shown in Fig. 4, of the drawings. Each of the members 1 and 2 consists of a body $1^a$—$2^a$ and a frame $1^b$—$2^b$ the bodies being centrally apertured as at $1^c$—$2^c$ to receive the securing rivet or eyelet 3 which may be projected through the apertures $1^c$—$2^c$ and upset, as shown in Figs. 3 and 4 of the drawings, to secure the ends $4^a$ of the tie wire or cord 4 between the sections 1 and 2 of the seal, as clearly shown in the drawings. After the members 1 and 2 are secured together the inner member may be filled with a sealing wax or substance 5 on which the brand or identification mark may be impressed, or such mark may be directly impressed on the metal members 1 or 2, if desired, or the sealing body 5 may be omitted entirely.

In Fig. 7 is shown a slight modification in which the cup members 1 and 2 are inserted in one another in a manner reversely to that shown in Fig. 4 of the drawings so as to cause the rim edge of the cup member 2 to bear on the tie wire or cord 4.

From the foregoing description taken in connection with the accompanying drawings, it is thought the complete construction, operation and advantages of my invention will be readily understood by those skilled in the art to which the invention appertains.

What I claim is:

1. A seal comprising a pair of cup-like members fitted one within the other, a rivet passing through said members to connect them together, and a time member having its ends secured by and between said cup-like members, each of said cup-like members comprising a flat body having an annular flange held at right angles to said body and one of said cup-like members being held within the other cup-like member with the respective flanges parallel to one another, and to the central longitudinal axis of the rivet.

2. A seal comprising a pair of cup-like members of corresponding form fitted one within the other, back to back, and having alining central apertures, a rivet passing through said apertures for securing such members together, and a tie member having its ends held by and between said cup-like members, each of said cup-like members comprising a flat body having an annular flange held at right angles to said body and one of said cup-like members being held within the other cup-like member with the respective flanges parallel to one another, and to the central longitudinal axis of the rivet.

3. A seal comprising a pair of cup-like members fitted one within the other, a rivet passing through said members to connect them together, a tie member having its ends secured by and between said cup-like members, and a sealing substance filling the inner cup-like member on which distinguishing marks may be impressed, each of said cup-like members comprising a flat body having an annular flange held at right angles to said body and one of said cup-like members being held within the other cup-like member with the respective flanges parallel to one another, and to the central longitudinal axis of the rivet.

4. A seal comprising a pair of cup-like members of corresponding form fitted one within the other, back to back, and having alining central apertures, a rivet passing through said apertures for securing such members together, a tie member having its ends held by and between said cup-like members, and a sealing substance filling the inner cup-like member on which distinguishing marks may be impressed, each of said cup-like members comprising a flat body having an annular flange held at right angles to said body and one of said cup-like members being held within the other cup-like member with the respective flanges parallel to one another, and to the central longitudinal axis of the rivet.

5. A seal comprising a pair of cup-like members each consisting of a flat body plate having a central aperture and an annular flange extended at right angles to the body plate, one of said cup-like members being held within the other cup-like member, a tubular rivet passed through the apertures of said cup-like members to secure them together, a tie member held between said cup-like members and clamped by the same.

6. A seal comprising a pair of cup-like members each consisting of a flat body plate having a central aperture and an annular flange extending at right angles to the body plate, one of said cup-like members being held within the other cup-like member, a tubular rivet passed through the apertures of said cup-like members to secure them together, a tie member held between said cup-like members and clamped by the same, and a sealing substance held within said cup-like members and within said tubular rivet upon which distinguishing marks may be impressed.

7. A seal comprising a pair of cup-like members each consisting of a flat body plate and an annular flange at right angles to the same, one of said cup-like members being fitted within the other, a rivet passing through said members to secure them together with their flanges parallel to one another, the body plate of one of said cup-like members having tie member receiving apertures and a tie member passed through said apertures and clamped between said cup-like members.

WILLIAM J. BAKER.

Witnesses:
R. B. MOORE,
HARRY BENKE.